United States Patent
Eddy et al.

(10) Patent No.: US 10,457,757 B2
(45) Date of Patent: Oct. 29, 2019

(54) HIGH PRESSURE FREE-RADICAL POLYMERIZATIONS

(71) Applicant: Dow Global Technologies LLC, Midland, MI (US)

(72) Inventors: Christopher R. Eddy, Lake Jackson, TX (US); Jeffery S. Bradley, Missouri City, TX (US); Otto J. Berbee, Hulst (NL); Sarat Munjal, Lake Jackson, TX (US); Bryan Gutermuth, Angleton, TX (US)

(73) Assignee: Dow Global Technologies LLC, Midland, MI (US)

( * ) Notice: Subject to any disclaimer, the term of this patent is extended or adjusted under 35 U.S.C. 154(b) by 6 days.

(21) Appl. No.: 15/574,310

(22) PCT Filed: Jun. 30, 2016

(86) PCT No.: PCT/US2016/040288
§ 371 (c)(1),
(2) Date: Nov. 15, 2017

(87) PCT Pub. No.: WO2017/004320
PCT Pub. Date: Jan. 5, 2017

(65) Prior Publication Data
US 2018/0134824 A1    May 17, 2018

Related U.S. Application Data

(60) Provisional application No. 62/186,484, filed on Jun. 30, 2015.

(51) Int. Cl.
*C08F 210/02* (2006.01)
*B01J 3/00* (2006.01)
*B01J 3/04* (2006.01)

(52) U.S. Cl.
CPC ............... *C08F 210/02* (2013.01); *B01J 3/00* (2013.01); *B01J 3/04* (2013.01); *B01J 3/042* (2013.01); *Y02P 20/582* (2015.11)

(58) Field of Classification Search
CPC ... B01J 3/00; B01J 3/04; C08F 210/02; C08F 2/01; C08F 3/042; C08F 220/06; Y02P 20/582
(Continued)

(56) References Cited

U.S. PATENT DOCUMENTS 8,729,186 B2    5/2014    Berbee et al.
8,871,876 B2   10/2014    Berbee et al.
(Continued)

FOREIGN PATENT DOCUMENTS

WO    2014/106067 A1    7/2014
WO    2014105110 A2     7/2014
WO    2016/077512 A2    5/2016

OTHER PUBLICATIONS

PCT/US2016/040288, International Search Report and Written Opinion dated Sep. 14, 2016.
(Continued)

*Primary Examiner* — William K Cheung
(74) *Attorney, Agent, or Firm* — Dinsmore & Shohl LLP

(57) ABSTRACT

A process to form an ethylene-based polymer comprising, in polymerized form, ethylene and at least one acid comonomer, said process comprising polymerizing a reaction mixture comprising the ethylene and the acid comonomer, in a reactor configuration comprising at least one Secondary compressor, at least one pressurization device, and at least one reactor selected from the following: at least one autoclave reactor, at least one tubular reactor, or a combination thereof; and wherein the reaction mixture is polymerized in the presence of at least one free-radical initiator, and at a pressure of at least 1000 Bar; and wherein at least a portion of a comonomer composition comprising at least a portion of the acid comonomer used in the polymerization, is compressed, to form a compressed comonomer composition, in the pressurization device, up to a discharge pressure
(Continued)

ranging from 1000 Bar to 4000 Bar, and at a discharge temperature (DT) from 10 C to 100 C; and wherein the compressed comonomer composition bypasses the Secondary compressor, and is fed, downstream from the Secondary compressor, into the reactor, and/or into one or more feed streams to the reactor.

10 Claims, 2 Drawing Sheets

(58) Field of Classification Search
USPC .......................................................... 526/64
See application file for complete search history.

(56) References Cited

U.S. PATENT DOCUMENTS

| | | |
|---|---|---|
| 9,120,880 B2 | 9/2015 | Zschoch et al. |
| 9,228,036 B2 | 1/2016 | Berbee et al. |
| 9,234,055 B2 | 1/2016 | Berbee et al. |
| 9,416,209 B2 | 8/2016 | Berbee et al. |
| 2015/0299357 A1* | 10/2015 | Berbee ...................... C08F 2/00 526/212 |
| 2017/0260474 A1 | 9/2017 | Gutermuth et al. |

OTHER PUBLICATIONS

PCT/US2016/040288, International Preliminary Report on Patentability dated Jan. 11, 2018.

* cited by examiner

HIGH PRESSURE FREE-RADICAL POLYMERIZATIONS

REFERENCE TO RELATED APPLICATIONS

This application is a 371 of international Patent Cooperation Treaty (PCT) application PCT/US2016/040288 filed on Jun. 30, 2016, which claims a priority to the U.S. Provisional Patent application Ser. No. 62/186,484 filed on Jun. 30, 2015.

BACKGROUND OF THE INVENTION

In the production of ethylene-based polymers containing, in polymerized form, one or more acid comonomers, for example, an ethylene-acrylic acid copolymer, the acid comonomer is typically injected at the suction of the Secondary compressor. The acid comonomer is typically corrosive and reactive, which leads to corrosion of the compressor, and negatively impacts the reliability of the compressor, resulting in downtime of the polymerization process and loss of polymer production. Thus, there is a need for new polymerization processes for the production of such ethylene-based polymers, and which result in minimizing downtime and maximizing polymer production. This need has been met by the following invention.

SUMMARY OF INVENTION

A process is provided, to form an ethylene-based polymer comprising, in polymerized form, ethylene and at least one acid comonomer, said process comprising polymerizing a reaction mixture comprising the ethylene and the acid comonomer, in a reactor configuration comprising at least one Secondary compressor, at least one pressurization device, and at least one reactor selected from the following: at least one autoclave reactor, at least one tubular reactor, or a combination thereof; and wherein the reaction mixture is polymerized in the presence of at least one free-radical initiator, and at a pressure of at least 1000 Bar; and wherein at least a portion of a comonomer composition comprising at least a portion of the acid comonomer used in the polymerization, is compressed, to form a compressed comonomer composition, in the pressurization device, up to a discharge pressure ranging from 1000 Bar to 4000 Bar, and at a discharge temperature (DT) from 10° C. to 100° C.; and wherein the compressed comonomer composition bypasses the Secondary compressor, and is fed, downstream from the Secondary compressor, into the reactor, and/or into one or more feed streams to the reactor.

DETAILED DESCRIPTION

Figure 1:
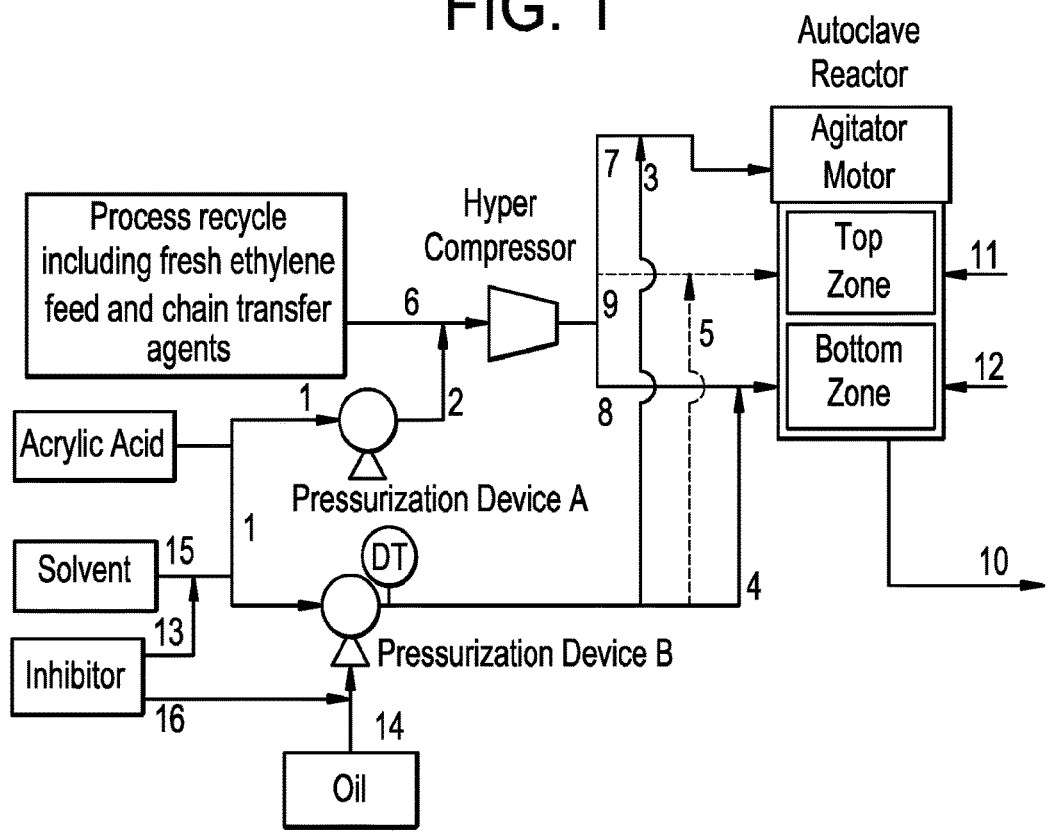
FIG. 1 depicts a reactor configuration scheme.

It has been discovered that the inventive process provides an improved process to polymerize ethylene-based copolymers containing, in polymerized form, one or more acid comonomers, which results in improved reliability of the devices of a reactor configuration, such as the compressors, since such devices have less frequent and/or intense exposure to acid comonomer. The inventive process can result in reduced plant shutdowns and increased polymer production.

As discussed above, a process is provided, to form an ethylene-based polymer comprising, in polymerized form, ethylene and at least one acid comonomer, said process comprising polymerizing a reaction mixture comprising the ethylene and the acid comonomer, in a reactor configuration comprising at least one Secondary compressor, at least one pressurization device, and at least one reactor selected from the following: at least one autoclave reactor, at least one tubular reactor, or a combination thereof; and wherein the reaction mixture is polymerized in the presence of at least one free-radical initiator, and at a pressure of at least 1000 Bar; and wherein at least a portion of a comonomer composition comprising at least a portion of the acid comonomer used in the polymerization, is compressed, to form a compressed comonomer composition, in the pressurization device, up to a discharge pressure ranging from 1000 Bar to 4000 Bar, and at a discharge temperature (DT) from 10° C. to 100° C., further from 10° C. to 90° C., further from 10° C. to 80° C.; and wherein the compressed comonomer composition bypasses the Secondary compressor, and is fed, downstream from the Secondary compressor, into the reactor, and/or into one or more feed streams to the reactor.

An inventive process may comprise a combination of two or more embodiments described herein.

In one embodiment, the discharge temperature is from 20° C. to 100° C., or from 20° C. to 95° C., or from 20° C. to 90° C., or from 20° C. to 85° C., or from 20° C. to 80° C., or from 20° C. to 75° C., or from 20° C. to 70° C., or from 20° C. to 65° C., or from 20° C. to 60° C.

In one embodiment, the discharge temperature is from 25° C. to 100° C., or from 25° C. to 95° C., or from 25° C. to 90° C., or from 25° C. to 85° C., or from 25° C. to 80° C., or from 25° C. to 75° C., or from 25° C. to 70° C., or from 25° C. to 65° C., or from 25° C. to 60° C.

In one embodiment, the discharge temperature is from 30° C. to 100° C., or from 30° C. to 95° C., or from 30° C. to 90° C., or from 30° C. to 85° C., or from 30° C. to 80° C., or from 30° C. to 75° C., or from 30° C. to 70° C., or from 30° C. to 65° C., or from 30° C. to 60° C.

In one embodiment, the discharge temperature is from 35° C. to 100° C., or from 35° C. to 95° C., or from 35° C. to 90° C., or from 35° C. to 85° C., or from 35° C. to 80° C., or from 35° C. to 75° C., or from 35° C. to 70° C., or from 35° C. to 65° C., or from 35° C. to 60° C.

In one embodiment, the pressure in at least one reactor is greater than, or equal to, 1000 Bar, or greater than, or equal to, 1500 Bar, or greater than, or equal to, 2000 Bar, or greater than 2200 bar, or greater than 2500 Bar.

In one embodiment, the pressure in at least one reactor is from 2000 to 4800 Bar, or from 2200 to 4700 Bar, or from 2500 to 4600 Bar.

In one embodiment, the temperature in at least one reactor is greater than, or equal to, 170° C., or greater than, or equal to, 180° C., or greater than, or equal to, 190° C.

In one embodiment, the temperature in at least one reactor is greater than, or equal to, 200° C., or greater than, or equal to, 210° C., or greater than, or equal to, 220° C.

In one embodiment, the at least one reactor is an autoclave reactor, and the control temperature in an autoclave reaction zone of the reactor is at least greater than, or equal to, 170° C., further greater than, or equal to, 180° C., further greater than, or equal to, 190° C.

In one embodiment, the at least one reactor is an autoclave reactor, and the control temperature in an autoclave reaction zone of the reactor is at least greater than, or equal to, 200° C., or greater than, or equal to, 210° C., or greater than, or equal to, 220° C.

In one embodiment, the at least one reactor is a tubular reactor, and the start temperature in a tubular reaction zone of the reactor is greater than, or equal to, 160° C., or greater than, or equal to, 170° C., or greater than, or equal to, 180° C.

In one embodiment, the at least one reactor is a tubular reactor, and the start temperature in a tubular reaction zone of the reactor is greater than, or equal to, 190° C., or greater than, or equal to, 200° C., or greater than, or equal to, 210° C.

In one embodiment, the residence time of the acid comonomer in the comonomer composition, from the discharge of the pressurization device to the inlet of the reactor, is from greater than 0 seconds to less than 30 minutes, or from 1 second to 25 minutes, or from 5 seconds to 20 minutes.

In one embodiment, the residence time of the acid comonomer in the comonomer composition, from the discharge of the pressurization device to the inlet of the reactor, is greater than 0 seconds and less than 10 seconds, or from 0.1 second to 5 seconds, or from 0.2 seconds to 2 seconds.

In one embodiment, the residence time of the acid comonomer in the comonomer composition, from the discharge of the pressurization device to the inlet of the reactor, is less than 7 minutes, or less than 4 minutes, or less than 2 minutes, or less than 1 minute.

In one embodiment, the reactor configuration comprises one Secondary compressor.

In one embodiment, the compressed comonomer composition bypasses each Secondary compressor in the reactor configuration. In a further embodiment, the reactor configuration comprises one Secondary compressor.

In one embodiment, ≥50 wt %, or ≥60 wt %, or ≥70 wt %, or ≥80 wt %, or ≥90 wt % of the comonomer composition is compressed in the pressurization device, to form the compressed comonomer composition. In one embodiment, ≤100 wt %, or ≤98 wt %, or ≤95 wt % of the comonomer composition is compressed in the pressurization device, to form the compressed comonomer composition.

In one embodiment, the at least one reactor is selected from the following: at least one autoclave reactor, or a combination of at least one autoclave reactor and at least one tubular reactor.

In one embodiment, the at least one reactor is an autoclave reactor.

In one embodiment, the compressed comonomer composition is fed directly into the reactor and/or fed into an ethylene feed stream to the reactor.

In one embodiment, the compressed comonomer composition contains one or more, or two or more, or three or more, or four or more, or five or more, recycle condensables.

In one embodiment, the at least one reactor comprises at least one reaction zone, and at least a portion of the comonomer composition is fed into this reaction zone.

In one embodiment, the reactor configuration comprises at least two reaction zones, in which the compressed comonomer composition comprising the acid comonomer is injected, independently from other feed components.

In one embodiment, the at least one reactor comprises at least two reaction zones, zone 1 and zone i (i≥2). In one embodiment, ≥20 wt %, or ≥30 wt %, or ≥40 wt %, of the compressed comonomer composition is fed to reaction zone 1. In one embodiment, ≥50 wt %, or ≥60 wt %, or ≥70 wt %, or ≥80 wt %, of the compressed comonomer composition is fed to reaction zone 1. In one embodiment, >20 wt %, or >30 wt %, or >40 wt %, of the compressed comonomer composition, is fed to reaction zone 2 (i=2). In one embodiment, >50 wt %, or >60 wt %, or >70 wt %, or >80 wt %, of the compressed comonomer composition, is fed to reaction zone 2 (i=2).

In one embodiment, the reactor configuration further comprises at least one Primary compressor.

In one embodiment, less than 70 wt %, or less than 60 wt %, or less than 50 wt %, of the total acid comonomer fed to the at least one reactor is fed through the Secondary compressor. In a further embodiment, at least 1 wt %, or at least 5 wt %, of the total amount of acid comonomer fed to the at least one reactor, is fed through the Secondary compressor.

In one embodiment, less than 50 wt %, or less than 40 wt %, or less than 30 wt %, or less than 20 wt %, of the total acid comonomer fed to the at least one reactor is fed through the Secondary compressor. In a further embodiment, at least 1 wt %, or at least 5 wt %, of the total amount of acid comonomer fed to the at least one reactor, is fed through the Secondary compressor.

In one embodiment, the compressed comonomer composition comprises all of the acid comonomer used in the polymerization. In another embodiment, the reactor configuration further comprises a stream, comprising the acid comonomer, which is fed through the Secondary compressor to the reactor, and wherein less than 70 wt %, or less than 60 wt %, or less than 50 wt %, or less than 40 wt %, of the total acid comonomer, fed to the at least one reactor, is fed through the Secondary compressor. In a further embodiment, at least 5 wt % or at least 10 wt %, of the total amount of acid comonomer, fed to the at least one reactor, is fed through the Secondary compressor.

In one embodiment, the reactor configuration further comprises a feed tank comprising one or more inhibitors.

In one embodiment, the reactor configuration further comprises at least one recycle stream. In a further embodiment, the recycle stream comprises ethylene.

In one embodiment, the reactor configuration further comprises at least two ethylene feed streams.

In one embodiment, greater than, or equal to, 20 wt %, or greater than, or equal to, 30 wt %, or greater than, or equal to, 40 wt %, of the total ethylene fed to the polymerization, is fed to reaction zone 1.

In one embodiment, greater than, or equal to, 50 wt %, or greater than, or equal to, 60 wt %, of the total ethylene fed to the polymerization, is fed to reaction zone 1.

In one embodiment, greater than, or equal to, 20 wt %, or greater than, or equal to, 30, or greater than, or equal to, 40 wt %, of the total ethylene fed to the polymerization, is fed to reaction zone 2.

In one embodiment, greater 50 wt %, or greater than 60 wt %, of the total ethylene fed to the polymerization, is fed to reaction zone 2.

In one embodiment, the discharge pressure in the second compressor is from 100 MPa to 400 MPa.

In one embodiment, the reactor configuration further comprises a stream, comprising the acid comonomer, which is fed through the Secondary compressor to the reactor, and wherein less than 70 wt % of the total acid comonomer fed to the at least one reactor is fed through the Secondary compressor. In a further embodiment, at least 5 wt % of the total amount of acid comonomer fed to the at least one reactor, is fed through the Secondary compressor.

In one embodiment, the second compressor is a reciprocation device.

In one embodiment, the acid comonomer is selected from an acrylic acid, (meth)acrylic acid, or acrylates (for example, methyl acrylate, ethyl acrylate, propyl acrylate, butyl acrylate), or a combination thereof, and further an acrylic acid.

In one embodiment, the reactor configuration further comprises an agitator motor connected to the at least one reactor. In a further embodiment, at least a portion of the compressed comonomer composition is fed into reaction zone 1, without flowing through an agitator motor compartment.

In one embodiment, acid comonomer content, in polymerized form, in the ethylene-based polymer is from 1.0 to 40.0 wt %, or from 2.0 to 35.0 wt %, or from 3.0 to 30.0 wt %, or from 3.0 to 25.0 wt %, or from 3.0 to 20.0 wt %, or from 3.0 to 15.0 wt %, or from 3.0 to 10.0 wt %, based on the weight of the ethylene-based polymer.

In one embodiment, the comonomer composition further comprises at least one compound selected from the following compounds i) through iv):

(Compound 1)

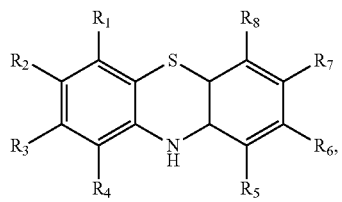

i)

wherein, for Compound 1, R1, R2, R3, R4, R5, R6, R7 and R8 are each independently selected from H, an alkyl, or an alkoxy, and further from H or alkyl (for example, a C1-C5 alkyl), and further H;

(Compound 2)

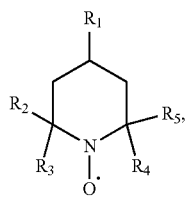

ii)

wherein, for Compound 2, R1 is selected from OH of OR, where R is alkyl (for example, a C1-C5 alkyl), and further R1 is OH; R2, R3, R4 and R5 are each independently selected from H, an alkyl, or an alkoxy, and further from H or alkyl, and further alkyl, and further a C1-C5 alkyl;

(Compound 3)

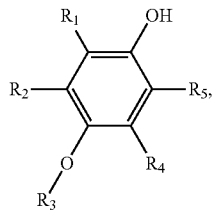

iii)

wherein, for Compound 3, R1, R2, R4 and R5 are each independently selected from H, an alkyl, or an alkoxy, further from H or alkyl, further H; and R3 is selected from H or an alkyl, further alkyl, and further a C1-C5 alkyl; or iv) a combination of two or more of Compounds 1 through 3.

As used herein $R_1$=R1, $R_2$=R2, $R_3$=R3, and so forth.

In one embodiment, the comonomer composition comprises less than, or equal to, 1.0 weight percent (based on the weight of the composition) of a non-aromatic polar compound, excluding alcohols, and other than the acid comonomer and other than Compound 2 above, and wherein the non-aromatic compound has a Dipole Moment greater than, or equal to, 1.00 Debye.

In one embodiment, the comonomer composition comprises at least one compound selected from the following compounds i), ii), or a combination thereof:

(Compound 1)

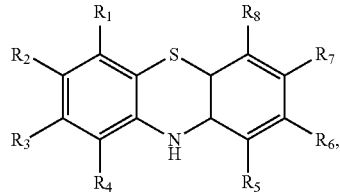

i)

wherein, for Compound 1, R1, R2, R3, R4, R5, R6, R7 and R8 are each independently selected from H, an alkyl, or an alkoxy, and further from H or alkyl (for example, a C1-C5 alkyl), and further H;

(Compound 2)

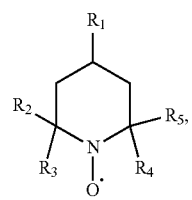

ii)

wherein, for Compound 2, R1 is selected from OH of OR, where R is alkyl (for example, a C1-C5 alkyl), and further R1 is OH; R2, R3, R4 and R5 are each independently selected from H, an alkyl, or an alkoxy, and further from H or alkyl, and further alkyl, and further a C1-C5 alkyl. In a further embodiment, the at least one compound is present in an amount greater than, or equal to, 0.1 ppm, or greater than, or equal to, 0.5 ppm, or greater than, or equal to, 1.0 ppm, based on the weight of the comonomer composition.

In one embodiment, the comonomer composition comprises at least one compound selected from Compound 1:

(Compound 1)

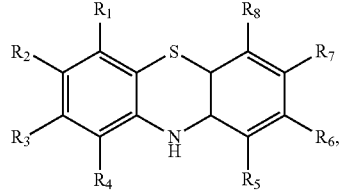

i)

wherein, for Compound 1, R1, R2, R3, R4, R5, R6, R7 and R8 are each independently selected from H, an alkyl, or an alkoxy, and further from H or alkyl (for example, a C1-C5 alkyl), and further H.

In one embodiment, comonomer composition comprises at least one compound is selected from Compound 2:

(Compound 2)

ii)

wherein, for Compound 2, R1 is selected from OH of OR, where R is alkyl (for example, a C1-C5 alkyl), and further R1 is OH; R2, R3, R4 and R5 are each independently selected from H, an alkyl, or an alkoxy, and further from H or alkyl, and further alkyl, and further a C1-C5 alkyl.

In one embodiment, the comonomer composition comprises at least one compound is selected from Compound 3:

(Compound 3)

iii)

wherein, for Compound 3, R1, R2, R4 and R5 are each independently selected from H, an alkyl, or an alkoxy, further from H or alkyl, further H; and R3 is selected from H or an alkyl, further alkyl, and further a C1-C5 alkyl. In a further embodiment, Compound 3 is present in an amount ≥250 ppm, or ≥300 ppm, or ≥400 ppm, or ≥500 ppm, based on the weight of the comonomer composition.

In one embodiment, the comonomer composition comprises at least one compound selected from the following compounds a) through d):

a)

monomethyl ether hydroquinone (MEHQ)

b)

Phenothiazine (PTZ)

c)

4-hydroxy Tempo or d) a combination thereof.

In one embodiment, the at least one compound is present in an amount greater than, or equal to, 0.1 ppm, or greater than, or equal to, 0.5 ppm, or greater than, or equal to, 1.0 ppm, based on the weight of the comonomer composition.

In one embodiment, the at least one compound is present in an amount from 1 ppm to 1000 ppm, or from 2 to 500 ppm, based on the weight of the comonomer composition.

In one embodiment, the comonomer composition comprises a dialkyl-4-methylphenol (for example, 2,6-di-tert-butyl-4-methylphenol), a dialkylphenol (for example 2,6-di-tert-butylphenol), or a combination thereof. In one embodiment, the dialkyl-4-methylphenol and/or the dialkylphenol are/is present in an amount from 1 ppm to 1000 ppm, or from 2 to 500 ppm, based on the weight of the comonomer composition.

In one embodiment, the comonomer composition comprises a dialkyl-4-methylphenol, a dialkylphenol, or a combination thereof, and comprises at least one of Compound 1, Compound 2 and/or Compound 3, each described above. In one embodiment, the dialkyl-4-methylphenol and/or the dialkylphenol are/is present in an amount from 1 ppm to 1000 ppm, or from 2 to 500 ppm, based on the weight of the comonomer composition.

In one embodiment, the comonomer composition comprises a dialkyl-4-methylphenol, and wherein the alkyl is selected from methyl, ethyl, propyl, iso-propyl, n-butyl, or t-butyl. In one embodiment, the dialkyl-4-methylphenol is present in an amount from 1 ppm to 1000 ppm, or from 2 to 500 ppm, based on the weight of the comonomer composition.

In one embodiment, the comonomer composition comprises a dialkyl-4-methylphenol, and comprises at least one of Compound 1, Compound 2 and/or Compound 3, each described above. In one embodiment, the dialkyl-4-methylphenol is present in an amount from 1 ppm to 1000 ppm, or from 2 to 500 ppm, based on the weight of the comonomer composition. In a further embodiment, the alkyl is selected from methyl, ethyl, propyl, iso-propyl, n-butyl, or t-butyl.

In one embodiment, the comonomer composition comprises a dialkylphenol, and wherein the alkyl is selected from methyl, ethyl, propyl, iso-propyl, n-butyl, or t-butyl. In one embodiment, the dialkylphenol is present in an amount from 1 ppm to 1000 ppm, or from 2 to 500 ppm, based on the weight of the comonomer composition.

In one embodiment, the comonomer composition comprises a dialkylphenol, or a combination thereof, and comprises at least one of Compound 1, Compound 2 and/or Compound 3, each described above. In one embodiment, the dialkylphenol is present in an amount from 1 ppm to 1000 ppm, or from 2 to 500 ppm, based on the weight of the comonomer composition. In a further embodiment, the alkyl is selected from methyl, ethyl, propyl, iso-propyl, n-butyl, or t-butyl.

In one embodiment, the comonomer composition further comprises an oil.

An inventive process may comprise a combination of two or more embodiments as described herein.

In one embodiment, an inhibitor composition comprising at least one compound selected from i) through iv) below, is fed to the at least one pressurization device:

(Compound 1)

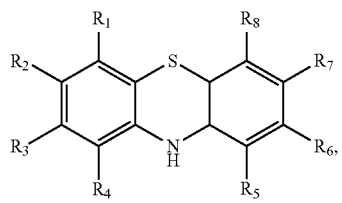

i)

wherein, for Compound 1, R1, R2, R3, R4, R5, R6, R7 and R8 are each independently selected from H, an alkyl, or an alkoxy, and further from H or alkyl (for example, a C1-C5 alkyl), and further H;

(Compound 2)

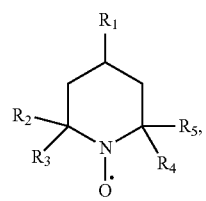

ii)

wherein, for Compound 2, R1 is selected from OH of OR, where R is alkyl (for example, a C1-C5 alkyl), and further R1 is OH; R2, R3, R4 and R5 are each independently selected from H, an alkyl, or an alkoxy, and further from H or alkyl, and further alkyl, and further a C1-C5 alkyl;

(Compound 3)

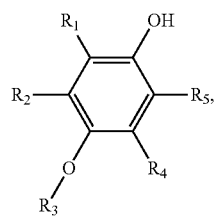

iii)

wherein, for Compound 3, R1, R2, R4 and R5 are each independently selected from H, an alkyl, or an alkoxy, further from H or alkyl, further H; and R3 is selected from H or an alkyl, further alkyl, and further a C1-C5 alkyl; or iv) a combination of two or more of Compounds 1 through 3.

As used herein $R_1$=R1, $R_2$=R2, $R_3$=R3, and so forth.

In one embodiment, the inhibitor composition comprises less than, or equal to, 1.0 weight percent (based on the weight of the composition) of a non-aromatic polar compound, excluding alcohols, and other than the acid comonomer and other than Compound 2 above, and wherein the non-aromatic compound has a Dipole Moment greater than, or equal to, 1.00 Debye.

In one embodiment, the inhibitor composition comprises at least one compound selected from the following compounds i), ii), or a combination thereof:

(Compound 1)

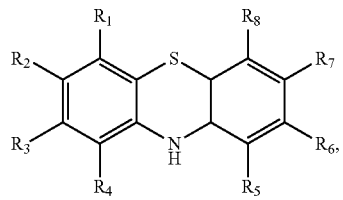

i)

wherein, for Compound 1, R1, R2, R3, R4, R5, R6, R7 and R8 are each independently selected from H, an alkyl, or an alkoxy, and further from H or alkyl (for example, a C1-C5 alkyl), and further H;

(Compound 2)

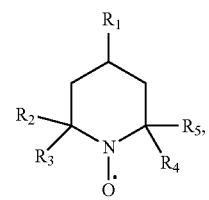

ii)

wherein, for Compound 2, R1 is selected from OH of OR, where R is alkyl (for example, a C1-C5 alkyl), and further R1 is OH; R2, R3, R4 and R5 are each independently selected from H, an alkyl, or an alkoxy, and further from H or alkyl, and further alkyl, and further a C1-C5 alkyl. In a further embodiment, the at least one compound is present in an amount greater than, or equal to, 0.1 ppm, or greater than, or equal to, 0.5 ppm, or greater than, or equal to, 1.0 ppm, based on the weight of the comonomer composition.

In one embodiment, the inhibitor composition comprises at least one compound selected from Compound 1:

(Compound 1)

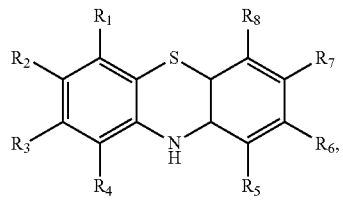

i)

wherein, for Compound 1, R1, R2, R3, R4, R5, R6, R7 and R8 are each independently selected from H, an alkyl, or an alkoxy, and further from H or alkyl (for example, a C1-C5 alkyl), and further H.

In one embodiment, the inhibitor composition comprises at least one compound is selected from Compound 2:

(Compound 2)

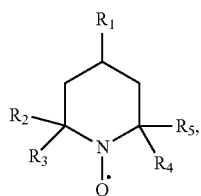

ii)

wherein, for Compound 2, R1 is selected from OH of OR, where R is alkyl (for example, a C1-C5 alkyl), and further R1 is OH; R2, R3, R4 and R5 are each independently selected from H, an alkyl, or an alkoxy, and further from H or alkyl, and further alkyl, and further a C1-C5 alkyl.

In one embodiment, the inhibitor composition comprises at least one compound is selected from Compound 3:

(Compound 3)

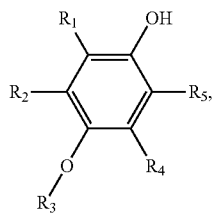

iii)

wherein, for Compound 3, R1, R2, R4 and R5 are each independently selected from H, an alkyl, or an alkoxy, further from H or alkyl, further H; and R3 is selected from H or an alkyl, further alkyl, and further a C1-C5 alkyl.

In one embodiment, the inhibitor composition comprises at least one compound is selected from the following compounds a) through d):

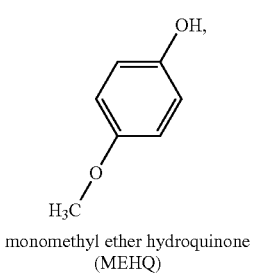

a)

monomethyl ether hydroquinone (MEHQ)

b)

Phenothiazine (PTZ)

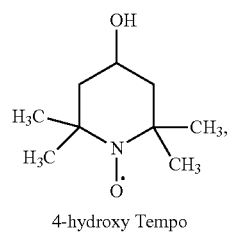

c)

4-hydroxy Tempo or d) a combination thereof.

In one embodiment, the at least one compound is present in an amount greater than, or equal to, 0.1 ppm, or greater than, or equal to, 0.5 ppm, or greater than, or equal to, 1.0 ppm, based on the weight of the inhibitor composition.

In one embodiment, the at least one compound is present in an amount from 1 ppm to 1000 ppm, or from 2 to 500 ppm, based on the weight of the inhibitor composition.

In one embodiment, the inhibitor composition further comprises a dialkyl-4-methylphenol (for example, 2,6-di-tert-butyl-4-methylphenol), a dialkylphenol (for example 2,6-di-tert-butylphenol), or a combination thereof; in combination with at least one of Compound 1, Compound 2 and/or Compound 3, each described above. In one embodiment, the dialkyl-4-methylphenol and/or the dialkylphenol are/is present in an amount from 1 ppm to 1000 ppm, or from 2 to 500 ppm, based on the weight of the comonomer composition.

In one embodiment, the inhibitor composition further comprises a dialkyl-4-methylphenol, in combination with at least one of Compound 1, Compound 2 and/or Compound 3, each described above. In one embodiment, the dialkyl-4-methylphenol is present in an amount from 1 ppm to 1000 ppm, or from 2 to 500 ppm, based on the weight of the comonomer composition. In a further embodiment, alkyl is selected from methyl, ethyl, propyl, iso-propyl, n-butyl, or t-butyl.

In one embodiment, the inhibitor composition further comprises a dialkylphenol, in combination with at least one of the following Compound 1, Compound 2 and/or Compound 3, each described above. In one embodiment, the dialkylphenol is present in an amount from 1 ppm to 1000 ppm, or from 2 to 500 ppm, based on the weight of the comonomer composition. In a further embodiment, alkyl is selected from methyl, ethyl, propyl, iso-propyl, n-butyl, or t-butyl.

In one embodiment, the inhibitor composition further comprises an oil.

In one embodiment, the comonomer composition and/or the inhibitor composition further comprises a solvent selected from the following: a hydrocarbon, an alcohol, a ketone, an aldehyde, an ester or a combination thereof, and further an alcohol, a ketone, an aldehyde, an ester (for example, acetate) or a combination thereof, and further an alcohol (for example, methanol, ethanol, propanol, isopropanol, tert-butanol).

Also provided is an inhibitor composition comprising at least one of Compound 1, Compound 2 and/or Compound 3, each described above; and a dialkyl-4-methylphenol (for example, 2,6-di-tert-butyl-4-methylphenol), a dialkylphenol (for example 2,6-di-tert-butylphenol), or a combination thereof. In a further embodiment, the inhibitor composition is fed into an acid feed to the reactor or into a pressurization device.

In one embodiment, the inhibitor composition comprises at least one of Compound 1, Compound 2 and/or Compound 3, each described above; and a dialkyl-4-methylphenol. In one embodiment, the dialkyl-4-methylphenol is present in an amount from 1 ppm to 1000 ppm, or from 2 to 500 ppm, based on the weight of the comonomer composition.

In one embodiment, the inhibitor composition comprises at least one of Compound 1, Compound 2 and/or Compound 3, each described above; and a dialkyl-4-methylphenol, and wherein the alkyl is selected from methyl, ethyl, propyl, iso-propyl, n-butyl, or t-butyl. In one embodiment, the dialkyl-4-methylphenol is present in an amount from 1 ppm to 1000 ppm, or from 2 to 500 ppm, based on the weight of the comonomer composition.

In one embodiment, the inhibitor composition comprises at least one of Compound 1, Compound 2 and/or Compound 3, each described above; and a dialkyphenol. In one embodiment, the dialkylphenol is present in an amount from 1 ppm to 1000 ppm, or from 2 to 500 ppm, based on the weight of the comonomer composition.

In one embodiment, the inhibitor composition comprises at least one of Compound 1, Compound 2 and/or Compound 3, each described above; and a dialkylphenol, and wherein the alkyl is selected from methyl, ethyl, propyl, iso-propyl, n-butyl, or t-butyl. In one embodiment, the dialkyl-4-methylphenol is present in an amount from 1 ppm to 1000 ppm, or from 2 to 500 ppm, based on the weight of the comonomer composition.

An inventive process may comprise a combination of two or more embodiments as described herein.

Also provided, is a composition comprising an ethylene-based polymer formed from an inventive method of one or more embodiments described herein.

In one embodiment, the composition is an aqueous dispersion.

In one embodiment, the ethylene-based polymer comprises, in the polymerized form, from 1.0 to 40 weight percent of the acid comonomer, or from 3.0 to 28 weight percent acid comonomer, and or from 5.0 to 25 weight percent acid comonomer, based on the weight of the polymer.

In one embodiment, the ethylene-based polymer has a density from 0.900 to 0.955 g/cc, or from 0.900 to 0.950 g/cc (1 cc=1 cm$^3$).

In one embodiment, the ethylene-based polymer has a melt index (I2) from 0.2 to 10000 g/10 min, or from 0.5 to 6000 g/10 min, or from 1 to 4000 g/10 min.

In one embodiment, the ethylene-based polymer has a melt index (I2) from 0.2 to 100 g/10 min, or from 0.5 to 50 g/10 min, or 1.0 to 20 g/10 min.

In one embodiment, the composition further comprises a second ethylene-based polymer. In a further embodiment, the second ethylene-based polymer is selected from an ethylene/alpha-olefin copolymer, a low density polyethylene (LDPE), a high density polyethylene (HDPE), or a combination thereof.

In one embodiment, the second ethylene-based polymer is a LDPE homopolymer.

In one embodiment, the second ethylene-based polymer is a linear low density polyethylene (LLDPE). Linear low density polyethylenes (LLDPEs) include copolymers of ethylene with one or more alpha-olefins, such as, but not limited to, propylene, butene-1, pentene-1, 4-methylpentene-1, pentene-1, hexene-1 and octene-1.

An inventive composition may comprise a combination of two or more embodiments as described herein.

Also provided, is an article comprising at least one component formed from an inventive composition.

In one embodiment, the article is selected from a coating, a film, a foam, a laminate, a fiber, dispersion or a tape.

In one embodiment, the article is an extrusion coating. In another embodiment, the article is a film.

An inventive article may comprise a combination of two or more embodiments as described herein.

High Pressure Free Radical Polymerization, Process Characteristics

The term "high pressure polymerization process," as used herein, refers to a free radical polymerization process in which homo- and or copolymerization is carried out at an elevated pressure typically of at least 100 MPa (for example, 100 MPa to 500 MPa) and elevated temperature (for example, 100 to 400° C.) conditions. High molecular weight, normally solid copolymers of ethylene and unsaturated carboxylic acids, such as acrylic acid and methacrylic acid, are well known (see for example, U.S. Pat. No. 3,132,120).

There are two main reactor types to produce, by a high pressure, free radical polymerization process, copolymers of ethylene and unsaturated carboxylic acids, namely the autoclave reactor and the tubular reactor. The autoclave process enables production of homogeneous, ethylene carboxylic acid interpolymer, while the tubular process, due to the high reactivity of carboxylic acid, will lead to less homogeneous ethylene-carboxylic acid interpolymers.

Initiators

Free radical initiators that are generally used include organic peroxides, such as peresters, perketals, peroxy ketones, percarbonates and cyclic multifunctional peroxides. These organic peroxide initiators are used in conventional amounts, typically from 0.005 to 0.2 weight percent based on the weight of polymerizable monomers. Other suitable initiators include azodicarboxylic esters, azodicarboxylic dinitriles and 1,1,2,2-tetramethylethane derivatives, and other components, capable of forming free radicals in the desired operating temperature range. Peroxides are typically injected as diluted solutions in a suitable solvent, for example, in a hydrocarbon solvent.

Chain Transfer Agents (CTA)

Chain transfer agents or telogens are used to control the melt index in a polymerization process. Chain transfer involves the termination of growing polymer chains, thus limiting the ultimate molecular weight of the polymer material. Chain transfer agents are typically hydrogen atom donors that will react with a growing polymer chain, and stop the polymerization reaction of the chain, and initiate the growth of a new polymer molecule. These agents can be of many different types, from saturated hydrocarbons, or unsaturated hydrocarbons, to aldehydes, ketones or alcohols. By controlling the concentration of the selected chain transfer agent, one can control the length of polymer chains, and, hence the molecular weight, for example, the number average molecular weight, Mn. The melt flow index (MFI or $I_2$) of a polymer, which is related to Mn, is controlled in the same way.

Suitable chain transfer agents include, but are not limited to, aliphatic and olefinic hydrocarbons, such as pentane, hexane, cyclohexane, propene, pentene or hexane; ketones such as acetone, diethyl ketone, methyl ethyl ketone (MEK) or diamyl ketone; aldehydes such as formaldehyde or acetaldehyde, propionaldehyde; and saturated aliphatic aldehyde alcohols such as methanol, ethanol, propanol or butanol. The chain transfer agent may also be a monomeric chain transfer agent. For example, see WO 2012/057975, U.S. 61/579,067 and U.S. 61/664,956. Furthermore the melt-index can be influenced by the build up and control of incoming ethylene impurities, like methane and ethane, peroxide dissociation products, like tert-butanol, acetone, etc., and or solvent components used to dilute the initiators. These ethylene impurities, peroxide dissociation products and/or dilution solvent components can act as chain transfer agents.

Polymers

In one embodiment, an ethylene-based polymer of this invention has a density from 0.910 to 0.960, more typically from 0.915 to 0.950, and even more typically from 0.920 to 0.940, grams per cubic centimeter (g/cc or g/cm$^3$). In one embodiment, an ethylene-based polymer has a melt index ($I_2$) from 0.2 to 5000 grams per 10 minutes (g/10 min) at 190° C./2.16 kg, further from 0.5 to 2000 grams per 10 minutes (g/10 min) at 190° C./2.16 kg, further from 1.0 to 1500 grams per 10 minutes (g/10 min) at 190° C./2.16 kg.

In one embodiment, the ethylene-based polymer is selected from ethylene acrylic acid (EAA), ethylene methacrylic acid (EMAA), vinyl acetate, ethyl acrylate, or butyl acrylate. Also, optional secondary comonomers include carbon monoxide, silane-containing comonomers, and others. Terpolymers, such as ethylene-AA-MAA terpolymers may also be formed. Other suitable secondary or higher comonomers to be used in the ethylene-based polymers include, but are not limited to, ethylenically unsaturated monomers and especially $C_{3-20}$ alpha-olefins, carbon monoxide, vinyl acetate, and $C_{2-6}$ alkyl acrylates. Other suitable secondary or higher comonomers are described in Ehrlich, P.; Mortimer, G. A.; Adv. Polymer Science; Fundamentals of Free-Radical Polymerization of Ethylene; Vol. 7, pp. 386-448 (1970)—see reference 1.

Additives

One or more additives may be added to a composition comprising an inventive polymer. Suitable additives include stabilizers; fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils.

Definitions

Unless stated to the contrary, implicit from the context, or customary in the art, all parts and percents are based on weight, and all test methods are current as of the filing date of this disclosure.

The term "oil" is known in the art, and typically refers to viscous liquid with increased viscosity, as compared to that of water at the same temperature and pressure, and which is typically derived from petroleum. The oil provides lubrication and reduced friction between moving surfaces of rotational and/or reciprocating mechanisms. The oil can consist of single and/or multiple components. Additives might be added to improve lubricity, flow properties, and/or other properties. Examples of suitable oils include mineral oils.

The term "polymer" refers to a compound prepared by polymerizing monomers, whether of the same or a different type. The generic term polymer thus embraces the term homopolymer (which refers to polymers prepared from only one type of monomer, with the understanding that trace amounts of impurities can be incorporated into the polymer structure), and the term "interpolymer" as defined below. Trace amounts of impurities may be incorporated into and/or within the polymer.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises a majority amount of polymerized ethylene (based on the weight of the polymer) and, optionally, at least one comonomer.

The term "ethylene-based interpolymer" refers to an interpolymer that comprises a majority amount of polymerized ethylene (based on the weight of the interpolymer) and at least one comonomer.

The term "ethylene-based copolymer" refers to a copolymer that comprises a majority amount of polymerized ethylene (based on the weight of the interpolymer) and a comonomer as the only monomer types.

The phrase "high pressure, free-radical polymerization process," as used herein, refers to a free radical initiated polymerization, carried out at an elevated pressure of at least 100 MPa (1000 Bar).

The terms "feed" or "feed stream," as used herein, refer to fresh and/or recycled component(s) added to a reaction zone, at an inlet to the reaction zone.

The terms "ethylene feed" or "ethylene feed stream," as used herein, refer to the fresh ethylene feed and/or recycled ethylene and other reactant(s) added to a reaction zone, at the inlet to the reaction zone.

The term "feed component(s)," as used herein, refer to the component(s) added to a reaction zone, at the inlet to the reaction zone.

The term "fresh," when used herein, in reference to a reactant(s) (i.e., "fresh ethylene," "fresh CTA"), refers to reactant(s) provided from an external source(s), and not provided internally from a recycled source(s). For example, in an embodiment, fresh ethylene is used as "make-up ethylene" required to compensate for the ethylene consumed by the polymerization and/or lost through, for example, purge from the process, or for residual ethylene in the polymer.

The term "recycle stream" refers to recycled component(s) that are separated from the polymer after exiting a reactor, and are fed, after re-pressurization, to one or more reaction zones, at the inlet to each reaction zone.

The term "recycle condensables" refers to components, comprising, for instance carboxylic acid, solvent, CTA, lubrication oil etc., which are condensed and separated in the compression stages of the Booster and/or Primary compressor, and are collected to be recycled, without further treatment, or after filtration, purification and/or separation, to one or more feed streams of the reactor configuration.

The term "reaction zone," as used herein, refers to a reactor zone where polymerization reaction is initiated or reinitiated by the addition of free radicals and/or the decomposition of components into free radicals, and/or the decomposition of components to generate free radicals.

The term "reactor configuration," as used herein, refers to the components (devices) used to polymerize and isolate a polymer. Such components/devices include, but are not limited to, one or more reactors, a Secondary-compressor, a Primary compressor, and a Booster compressor.

The term "pressurization device" refers to a piece of equipment, such as a pump or a compressor, which increases the pressure of a liquid or a liquid feed to a higher pressure level.

The term "discharge temperature (DT)," as used herein in reference to a pressurization device, refers to the temperature of the discharged stream at the exit of the pressurization device. The discharged temperature can be measured using a thermocouple located at the discharge (outlet) of pump.

The term discharge pressure," as used herein in reference to a pressurization device, refers to pressure of the feed stream at the point that it exits the pressurization device. The discharged pressure can be measured by, for example, a pressure gauge or a pressure transmitter.

The term "packing" refers to the seal around the movable plunger or piston used to pressurize feed components.

The term "residence time," as used herein, refers to length of time that a feed component resides in a particular portion of the reactor configuration. For example, the time spent from the discharge of a pressurization device to the inlet of a reactor.

The term "reciprocation device," as used herein, refers to a device that generates a repetitive linear motion, such as an up-and-down linear motion or a back-and-forth linear motion. Examples of such devices include a plunger pump or a plunger compressor.

The term "rotation device," as used herein, refers to a device that generates a repetitive angular displacement around a central axis. Examples of such devices include a rotational agitator and a rotational compressor.

The terms "agitator motor" or "rotational agitator," as used herein, refer to the agitator mounted in a high pressure autoclave, driven by an internal or external driver, for example, an electric motor, and providing, through its rotational movement, the required back-mixing, to carry out the reaction at well-mixed and stable conditions within a reaction zone of the reactor. The rotational agitator is supported by an internal bearing system. The reliability of the bearing system is affected by the occurrence of self-polymerization of the high reactive comonomer and/or metallurgic corrosion by the polar nature of the comonomer. Feeding the inventive composition will greatly improve the lubrication in the bearing, and reduce or prevent above negative effects in the bearing system.

The term "agitator motor compartment" refers to a compartment in the autoclave reactor containing the electric motor driving the agitator in the autoclave reactor. The motor compartment is separated from the adherent reaction zone through a positive flow over a separation device between the motor compartment and adherent reaction zone. The separation device contains a shaft passage and/or additional inlet ports.

The term "pressurizing" refers to increasing the pressure a liquid or liquid feed to a higher pressure level.

The term "compression" refers to increasing the pressure of a vapor (for example, ethylene vapor below or above its critical point) to a higher pressure level.

The Booster compressor (Booster) is a device that compresses, for example, the following: a) the low pressure recycle coming from the LPS (Low pressure Separator), and b) optionally, the recycled compressor packing leaks; each to the pressure level required at the inlet side of the Primary compressor. This compression can take place in one or multiple compression stages, and can be combined with intermediate cooling. A Booster can consist of single or multiple compressor frames, and can be potentially combined with Primary compressor frame(s). Condensables are condensed and can be collected and removed after each compression stage.

The Primary compressor (Primary) is a device that compresses, for example, the following: a) the incoming ethylene, and/or b) the low pressure recycle coming from the Booster, and/or c) the recycled compressor packing leaks; each to the pressure level required at the inlet side of the Secondary compressor. This compression can take place in one or multiple compression stages, and can be combined with intermediate cooling. The Primary can consist of single or multiple compressor frames, and can be potentially combined with Booster compressor frame(s). Condensables are condensed and can be collected and removed after each compression stage.

Secondary compressor or Hyper compressor (Hyper), is a device that compresses gas or gases, for example, the following: the ethylene (in gaseous state or supercritical state) coming from the HPR (High Pressure Recycle) and/or the Primary compressor; each to a pressure level required to feed the reactor at its inlet pressure set point. This compression can take place in one or multiple compression stages, and can be combined with intermediate cooling. The Secondary compressor typically comprises a plunger reciprocating compressor, and can consist of single or multiple compressor frame(s).

Feeding a high reactive comonomer could include pressurizing and feeding the reactive comonomer with an ultra-high pressure reciprocating plunger pump, directly to a reactor zone and/or to a feed stream to the reaction zone, and/or feeding the reactive comonomer by a combination of pressurizing with a high pressure pump, and further compressing through reciprocating plunger compressors (for example, Secondary, Primary and/or Booster).

The term "acid comonomer," as used herein, refers to a comonomer comprising a carbon-carbon double bond, and a carboxylic acid group and/or an ester group.

The term "comonomer composition" as used herein, refers to the fresh acid comonomer feed, which may also, optionally, include additional components, such one or more solvents, and one or more inhibitors to improve thermal stability of the acid comonomer.

Melting temperature, at pressure (P), of the acid comonomer, as used herein, is the temperature, at pressure (P), when the last crystal of the comonomer disappears upon depressurization.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

Test Methods

Density: Samples for density measurement are prepared according to ASTM D 1928. Polymer samples are pressed at 190° C. and 30,000 psi (207 MPa) for three minutes, and then at 21° C. and 207 MPa for one minute. Measurements are made within one hour of sample pressing using ASTM D792, Method B.

Melt Index: Melt index, or $I_2$, (grams/10 minutes or dg/min) is measured in accordance with ASTM D 1238, Condition 190° C./2.16 kg. $I_{10}$ is measured with ASTM D 1238, Condition 190° C./10 kg.

EXPERIMENTAL

Simulated Reactor and Acrylic Acid Feed Configurations CP1, IP1, IP2, IP3, and IP4

FIG. 1 shows a generalized scheme for the copolymerization of ethylene and a comonomer, via a high pressure autoclave reactor, consisting of two reaction zones. In FIG. 1, the numerical notations are as follow:
1. Acrylic acid feed to the reaction system,
2. Pressurized acrylic acid feed to Hyper compressor suction, 3. Pressurized acrylic acid feed to top reaction zone and agitator motor,
4. Pressurized acrylic acid feed to bottom reaction zone,
5. Alternative pressurized fresh acrylic acid feed to top reaction zone,
6. Fresh ethylene feed and process recycled stream to Hyper compressor suction,
7. Pressurized process feed to top reaction zone and agitator motor,
8. Pressurized process feed to bottom reaction zone,
9. Alternative pressurized process feed to top reaction zone,
10. Reactor outlet,
11. Top reaction zone initiator feed,
12. Bottom reaction zone initiator feed,
13. Inhibitor feed to acrylic acid,
14. Oil flow to packing of Pressurization Device B,
15. Solvent feed to acrylic acid, and
16. Inhibitor feed to packing of Pressurization Device B.

In the comparative polymerization (CP1), a comonomer composition comprising acrylic acid or "acrylic acid feed (1)," to the system, is combined with fresh ethylene and process recycled stream (6), at the suction of the Secondary compressor (or Hyper compressor). The pressure requirement of pressurization device A to feed the acrylic acid (2) in CP1 is below 5000 psi (345 Bar). The Secondary compressor pressurizes the ethylene, acrylic acid, and other components, such as chain transfer agents, up to a discharge pressure, for feed to an autoclave reactor, where polymerization of the ethylene and acrylic acid occurs. The reactor feed is divided into two equal streams, one to the top zone of the reactor (7) and the other to the bottom zone of the reactor (8). In the comparative polymerization (CP1), the agitator motor is mounted within the reactor vessel, at the top of the reactor vessel, and the feed to the top zone of the reactor (7) first passes through a motor compartment. Injection of free radical initiators into each zone (11 and 12) leads to polymerization of the ethylene and acrylic acid. In the bottom zone, effluent from the top zone is combined with the feed to the bottom zone (8). The resulting polymer and unreacted compounds, such as monomers, exit the reactor (stream 10) to a separator, which is not shown.

In the inventive polymerization (IP1), acrylic acid feed (1) to the system is combined with fresh ethylene and process recycled streams, at the discharge of the Secondary compressor (7 and 8). The pressure requirement of pressurization device B to feed the acrylic acid (3 and 4) in IP1 is above 14500 psi (1000 Bar), and in some instances above 29000 psig (2000 barg). The Secondary compressor pressurizes the ethylene and other components, such as chain transfer agents, up to a discharge pressure, for feed to an autoclave reactor, where polymerization of the ethylene and acrylic acid occurs. The reactor ethylene feed is divided into two equal streams, one to the top zone of the reactor (7) and the other to the bottom zone of the reactor (8). In the inventive polymerization (IP1), the agitator motor is mounted within the reactor vessel, at the top of the reactor vessel, and the feed to the top zone of the reactor (7) first passes through a motor compartment. Injection of free radical initiators into each reaction zone (not shown in FIG. 1) leads to polymerization of the ethylene and acrylic acid. The reaction is initiated in each reaction zone below the agitator motor, with the help of one or more free radical initiators (no polymerization within the agitator motor). In the bottom zone, effluent from the top zone is combined with the feeds to the bottom zone (8 and 4). The resulting polymer and unreacted compounds, such as monomers, exit the reactor (stream 10) to a separator, which is not shown.

In the inventive polymerization (IP2), acrylic acid feed (1) to the system is combined with fresh ethylene and process recycled stream, at the discharge pressure of the Secondary compressor (8 and 9). The pressure requirement of pressurization device B to feed the acrylic acid (4 and 5) in IP2 is above 14500 psig (1000 barg), and in some instances above 29000 psi (2000 Bar). The Secondary compressor pressurizes the ethylene and other components, such as chain transfer agents, up to a discharge pressure, for feed to an autoclave reactor, where polymerization of the ethylene and acrylic acid occurs. The reactor ethylene feed is divided into three streams. Ethylene, fed to the top zone of the reactor, is divided equally between two streams (7 and 9), and the total of these two streams is equal to the ethylene fed to the bottom zone of the reactor (8). In the inventive polymerization (IP2), the agitator motor is mounted within the reactor vessel, at the top of the reactor vessel, and a portion of the feed to the top zone of the reactor first passes through a motor compartment (7), and the remaining feed bypasses the motor, and is fed directly to the top zone (9). Injection of free radical initiators into each zone (not shown in FIG. 1) leads to polymerization of the ethylene and acrylic acid. In the bottom zone, effluent from the top zone is combined with the feeds to the bottom zone (8 and 4). The resulting polymer and unreacted compounds, such as monomers, exit the reactor (stream 10) to a separator, which is not shown.

In the inventive polymerization (IP3), acrylic acid feed (1) to the system is preferentially combined with the fresh ethylene and process recycled stream, at a discharge pressure of the Secondary compressor, and fed to the top zone of the reactor (7). The pressure requirement of pressurization device B to feed the acrylic acid (3) in IP3 is above 14500 psi (1000 Bar), and in some instances above 29000 psi (2000 Bar). The Secondary compressor pressurizes the ethylene and other components, such as chain transfer agents, up to a discharge pressure, for feed to an autoclave reactor, where polymerization of the ethylene and acrylic acid occurs. The reactor ethylene feed is divided into two equal streams, one to the top zone of the reactor (7) and the other to the bottom zone of the reactor (8). In the inventive polymerization (IP3), the agitator motor is mounted within the reactor vessel, at the top of the reactor vessel, and the feed to the top zone of the reactor (7) first passes through a motor compartment. Injection of free radical initiators into each zone (not shown in FIG. 1) leads to polymerization of the ethylene and acrylic acid. In the bottom zone, effluent from the top zone is combined with the feed to the bottom zone (8). The resulting polymer and unreacted compounds such as monomers exit the reactor (stream 10) to a separator, which is not shown.

In the inventive polymerization (IP4), acrylic acid feed (1) to the system is preferentially combined with the fresh ethylene and process recycled streams, at the discharge of the Secondary compressor, and fed to the bottom zone of the reactor (8). The pressure requirement of pressurization device B to feed the acrylic acid (4) in IP3 is above 14500 psi (1000 Bar), and in some instances above 29000 psi (2000 bar). The Secondary compressor pressurizes the ethylene and other components, such as chain transfer agents, up to a discharge pressure, for feed to an autoclave reactor, where polymerization of the ethylene and acrylic acid occurs. The reactor ethylene feed is divided into two equal streams, one to the top zone of the reactor (7) and the other to the bottom zone of the reactor (8). In the inventive polymerization (IP4), the agitator motor is mounted within the reactor vessel, at the top of the reactor vessel, and the feed to the top zone of the reactor (7) first passes through a motor compartment. Injection of free radical initiators into each zone (not shown in FIG. 1) leads to polymerization of the ethylene and acrylic acid. In the bottom zone, effluent from the top zone is combined with the feed to the bottom zone (8 and 4). The resulting polymer and unreacted compounds, such as monomers, exit the reactor (stream 10) to a separator, which is not shown.

In the inventive polymerization (IP5), all feeds are the same as for IP1, except additional inhibitor (13) and solvent (15) is fed with the acrylic acid feed. In the inventive polymerization (IP6), all feeds are the same as for IP1, except additional solvent (15) is fed with the acrylic acid feed. In the inventive polymerization (IP7), all feeds are the same as for IP1 except additional inhibitor (16) and oil (14) is fed to the packing of the pressurization device with the acrylic acid feed.

For each polymerization discussed above, the reaction mixture is polymerized in the presence of at least one free-radical initiator, and at a pressure of at least 1000 Bar. In all of the inventive polymerizations (IP1, IP2, IP3, IP4, IP5, IP6, and IP7), the acrylic acid feed (1) is controlled, leading to a discharge temperature (DT) of pressurization device B in the range from 30° C. to 100° C. n the inventive polymerizations IP5, IP6, and IP7, the acrylic acid feed (1) is controlled, leading to a discharge temperature (DT) of pressurization device B in the range from 0° C. to 20° C. above the melting temperature of the acrylic acid, at the discharge pressure of the compressed comonomer composition.

Table 1 lists polymerization conditions based on FIG. 1 described above. Table 2 is a summary of some addition feeds for inhibitor, oil, and solvent.

be improved, and longer motor life for the agitator. Polymerizations IP3 and IP4 also would provide improved acid distribution in the polymer chains of the final ethylene-based polymer. Polymerization IP2 allows for the bypass of the acid comonomer around Secondary-compressor, around the agitator motor and around the agitator top bearing system. Polymerizations IP5 and IP7 would provide improved thermal stability for the acrylic acid, and would eliminate or reduce the self-polymerization of the acid comonomer in pressurization device B. Polymerization IP6 would reduce the freezing point for the acrylic acid, and would eliminate or reduce the solidification of acrylic acid in the pressurization device B, and the discharged section of device B.

Test Method for the Solidification Point of the Acid Comonomer

Table 3 lists the reagents used in the studies below, the supplier, and their purity of the tested carboxylic acids, cosolvents and secondary comonomers.

TABLE 3

| Reagents | | |
|---|---|---|
| Product | Company | Purity |
| Acrylic acid | Aldrich | Anhydrous, contains 180-200 ppm MEHQ as inhibitor, Purity 99% |
| Methacrylic acid | Aldrich | Contains 250 ppm MEHQ as inhibitor, Purity 99% |

High Pressure—Melting Temperature/Crystallization Temperature Reduction Study

Figure 2:
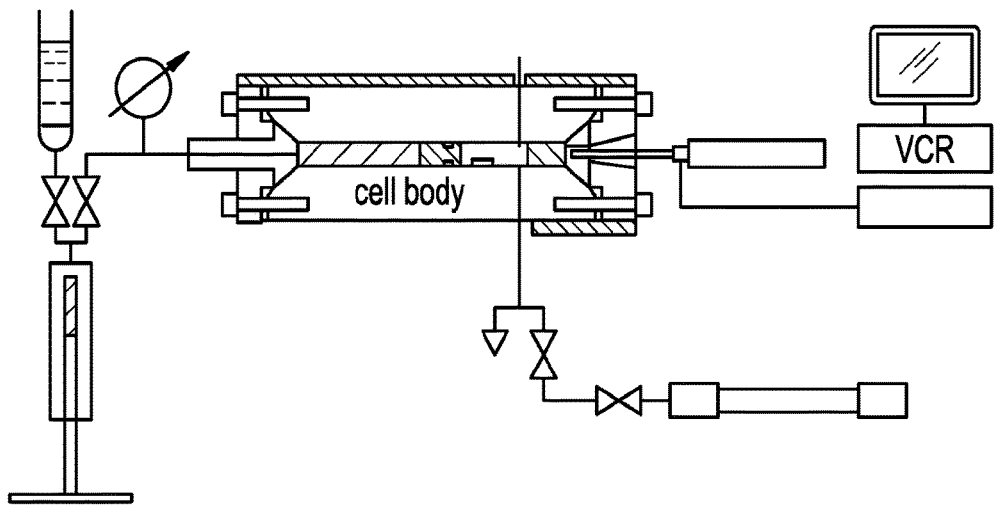
FIG. 2 is a schematic of a high-pressure cell.

The high-pressure cell for visual observation of liquid/solid or liquid/liquid phase equilibrium, up to 3,000 bar, is shown in FIG. 2. FIG. 2 shows the following equipment

TABLE 1

| | | | | | | |
|---|---|---|---|---|---|---|
| | | | | Polymerization Conditions | | |
| Ex. | Stream 6 Ethylene flow to Secondary (lbs/hr) | Stream 2 Fresh Acrylic Acid feed to Secondary (lbs/hr) | Stream 7 Fresh acrylic acid feed to zone 1, through Motor (lbs/hr) | Stream 9 Fresh Acrylic Acid feed to zone 1 directly to reaction zone 1 (lbs/hr) | Stream 8 Fresh Acrylic Acid feed to zone 2 (lbs/hr) | % Ethylene through the optional top zone mounted motor Stream 7/(Stream 7 + 8 + 9) | % Ethylene to reaction zone 2 Stream 8/(Stream 7 + 8 + 9) |
| CP1 | 60,000 | 2560 | 0 | 0 | | 50 | 50 |
| IP1 | 62,500 | 0 | 1280 | 0 | 1280 | 50 | 50 |
| IP2 | 62,500 | 0 | 0 | 1280 | 1280 | 25 | 50 |
| IP3 | 62,500 | 0 | 2560 | 0 | 0 | 50 | 50 |
| IP4 | 62,500 | 0 | 0 | 0 | 2560 | 50 | 50 |

TABLE 2

| | Additional Feeds | | | |
|---|---|---|---|---|
| Ex. | Stream 13 Inhibitor feed (lbs/hr) | Stream 14 Oil feed (lbs/hr) | Stream 15 Solvent feed (lbs/hr) | Stream 16 Inhibitor feed (lbs/hr) |
| IP5 | 0.025 | 8 | 1.25 | 0.0008 |
| IP6 | 0 | 8 | 256 | 0.0008 |
| IP7 | 0 | 8 | 0 | 0.0008 |

For the inventive polymerizations (IP1, IP2, IP3, IP4, IP5, IP6, IP7), improved reliability for the Secondary-compressor can be achieved. The inventive process provides for less acid through the Secondary-compressor. Longer cylinder life and longer valve life for Secondary compressor would parts: flange, moveable piston; cell body; steel cap; sheathed thermocouple; plug; bolt; sapphire window; cooling jacket; TEFLON O-ring; connecting plug to the pressurizing system; pressurizing fluid (heptane); internal volume with stirrer bar.

Peroxide/solvent mixtures were contained in a high-pressure cell of FIG. 2, with a variable internal volume. The cylindrical cell body (170 mm length with inner and outer diameter of 22 and 80 mm, respectively) was sealed conically, with a steel plug on each side of the cylindrical cell body. The plugs were pressed against the cell body with six bolts on each side of the cylindrical cell body. Tightly fitted into the internal boring was a moveable piston sealed with a TEFLON O-ring, which separated the mixture under investigation from heptanes, which acted as the pressurizing fluid. Through one of the capillary borings, at right angle to the cylindrical axis, a sheathed thermocouple was introduced into the peroxide solution. The flat surface of the moveable piston, which faced the sapphire window (of 18 mm diameter and 10 mm thickness) was polished to facilitate observation of phase behavior, in particular of the appearance and disappearance of crystals. The internal volume was monitored by an endoscope camera, and the pictures were permanently displayed on a screen. The pictures also included the actual pressure and temperature readings, to enable a more detailed analysis of the phase behavior. The pressure was recorded by a transducer (DMS 3 kbar, HBM-Messtechnik) in the ambient-temperature part of the heptane system. A cryostat, operated with methanol, was used for thermostatting the autoclave. The cooling fluid was passed through a brass mantle, which was closely fitted to the outer wall of the high-pressure cell. The temperature was measured within ±0.3° C., via the thermocouple sitting inside the mixture under investigation. The liquid mixture was stirred by a TEFLON-coated magnet, driven through the non-magnetic wall of the stainless-steel cell body (RGT 601, German Werkstoff-No. 2.4969, Arbed Saarstahl) by a large rotating magnet positioned under the autoclave.

The experimental procedure was as follows. The sapphire window was fixed on the right-hand side plug (see FIG. 2) and this plug sealed against the cell body. From the opposite side of the autoclave, the peroxide solution was filled into the internal volume, followed by introducing the moveable piston into the cylindrical boring. Subsequently, the second plug was sealed against the cell body, heptane was filled into the pressurizing unit, and a pressure of about 100 Bar was applied. The thermostating mantle was connected with the pre-cooled thermostat, and the autoclave brought to the lowest temperature selected for a particular experimental series. After reaching constant temperature, the pressure was raised, until solidification occurred. Because of delayed nucleation, and as general practice, the pressure associated with the solid/liquid equilibrium was determined at the point when the last crystal disappears upon depressurization (the pressure at this point was recorded as the pressure at the set melting temperature; or Tm at recorded pressure). For measuring such a point, the pressure was lowered in steps of about 50 bar, each step being followed by temperature equilibration.

Melting temperature at pressure (P), as used herein, is the temperature at pressure (P) when the last crystal of the "carboxylic acid-containing comonomer" disappears upon depressurization. The crystallization temperature at pressure (P), as used herein, is equal to the melting temperature at pressure (P), as discussed above.

Homogeneous-phase behavior could be easily seen from the twofold penetration of the clear solution by the illuminating the light, which was reflected at the polished flat surface of the moveable piston. As a first indication of crystallization, the internal volume turned slightly dark. Subsequently, crystals could be seen, and finally, the rotation of the magnetic stir bar ceased. Crystallization was additionally indicated by a rise in temperature. Comparison of crystallization and melting conditions, revealed that excess pressures, of up to 500 bar, had to be applied, in order to induce crystallization. This extra pressure may be considered as some safety margin with respect to preventing solidification, although it needs to be kept in mind that the extent of undercooling may vary with the specific conditions of the crystallization process. In several of the earlier experiments, even after complete melting, the fluid phase was found to stay opaque down to low pressure, where the fluid mixture, before pressurization, had been fully transparent. This observation is assigned to small quantities of water introduced during sample preparation. In order to eliminate unclear phase observations due to this effect, the entire set of experimental data described below were determined on dried solutions.

Figure 3:
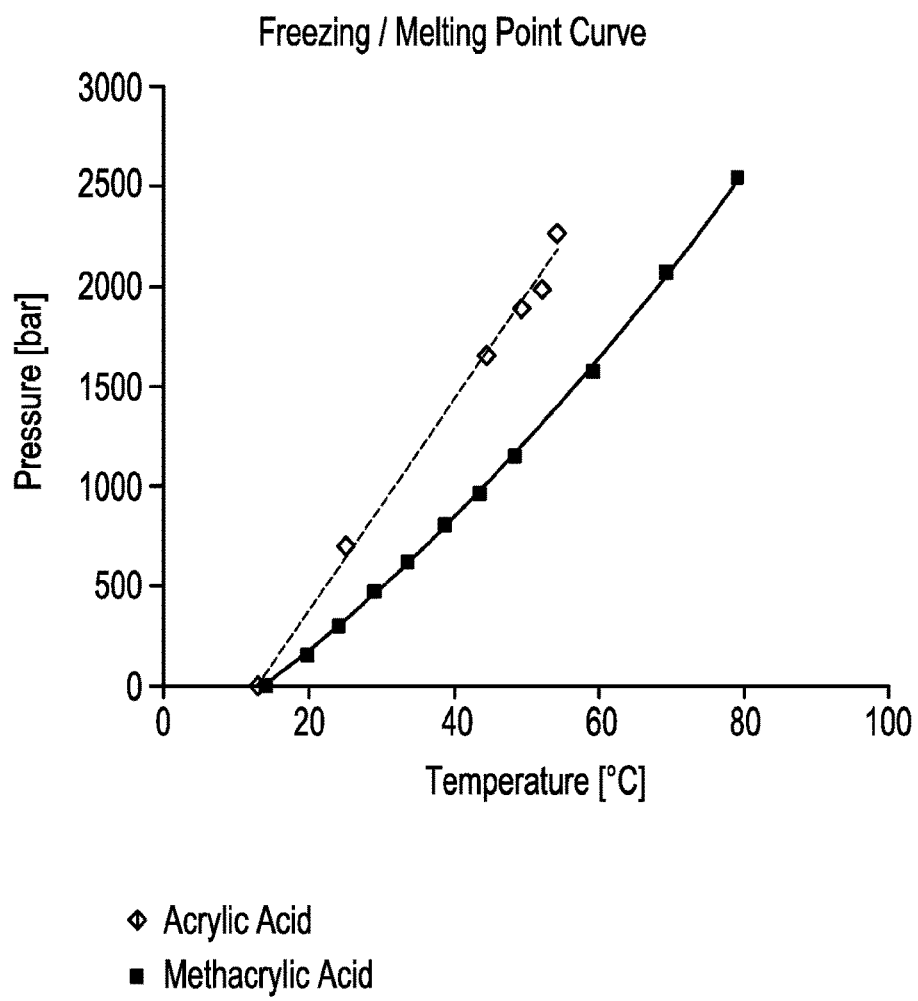
FIG. 3 depicts two melting point curves of carboxylic acids, each as a function of pressure.

Table 2 shows the main physical and/or chemical properties of the tested carboxylic acids and secondary comonomer. FIG. 3 shows the experimental data, fitting melting temperature of AA as function of pressure. In particular, FIG. 3 below shows the measured melting points of acrylic acid (AA) and methacrylic acid (MAA) (pure components). The observed melting temperatures and pressure levels associated with the pure AA and the pure MAA are listed in Table 4. The pressure examined in this "melting point reduction" study correlate with typically pressures used in a high pressure reactor, and the "Tm versus pressure" equations (for example, see Table 5) can be used to predict melting temperature as a function of pressure.

TABLE 4

Modeling of Melting Temperature as
Function of Pressure from Measured Data
$Tm\ (°\ C.)^A = a * (p\ (bar))^2 + b * p\ (bar) + c$

| Comonomer | a | b | c |
| --- | --- | --- | --- |
| AA | −7.92E−07 | 0.0208 | 12.3 |
| MAA | 2.90E−06 | 0.0328 | 14.4 |

The invention claimed is:

1. A process to form an ethylene-based polymer comprising, in polymerized form, ethylene and at least one acid comonomer,
    said process comprising polymerizing a reaction mixture comprising the ethylene and the acid comonomer, in a reactor configuration comprising at least one Secondary compressor, at least one pressurization device, and at least one reactor selected from the following: at least one autoclave reactor, at least one tubular reactor, or a combination thereof; and
    wherein the reaction mixture is polymerized in the presence of at least one free-radical initiator, and at a pressure of at least 1000 Bar;
    wherein at least a portion of a comonomer composition comprising at least a portion of the acid comonomer used in the polymerization, is compressed, to form a compressed comonomer composition, in the pressurization device, to a discharge pressure ranging from 1000 Bar to 4000 Bar, and at a discharge temperature (DT) from 10° C. to 100° C.; and
    wherein the compressed comonomer composition bypasses the Secondary compressor, and is fed, downstream from the Secondary compressor, into the reactor, and/or into one or more feed streams to the reactor;
    wherein the at least one reactor comprises at least two reaction zones, zone 1 and zone i (i≥2); and wherein greater than, or equal to, 20 wt % of the compressed comonomer composition is fed to reaction zone 1 and/or greater than 20 wt % of the compressed comonomer composition is fed to reaction zone 2 (i=2).

2. The process of claim 1, wherein the discharge temperature (DT) is from 0 to 20° C. above the melting temperature of the acid comonomer, at the discharge pressure of the compressed comonomer composition.

3. The process of claim 1, wherein the compressed comonomer composition is fed directly into the reactor and/or fed into an ethylene feed stream to the reactor.

4. The process of claim 1, wherein greater than, or equal to, 20 wt % of the compressed comonomer composition is fed to reaction zone 1.

5. The process of claim 1, wherein greater than 20 wt % of the compressed comonomer composition is fed to reaction zone 2 (i=2).

6. The process of claim 1, wherein the reactor configuration further comprises at least one recycle stream.

7. The process of claim 1, wherein the acid comonomer is selected from acrylic acid, (meth)acrylic acid, an acrylate, or a combination thereof.

8. The process of claim 1, wherein the comonomer composition further comprises at least one compound selected from the following compounds i) through iv):

(Compound 1)

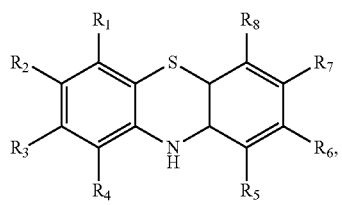

i)

wherein, for Compound 1, R1, R2, R3, R4, R5, R6, R7 and R8 are each independently selected from H, an alkyl, or an alkoxy;

(Compound 2)

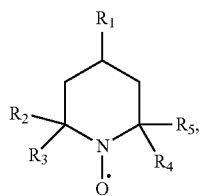

ii)

wherein, for Compound 2, R1 is selected from OH or O—R, wherein R is alkyl; and R2, R3, R4 and R5 are each independently selected from H, an alkyl, or an alkoxy;

(Compound 3)

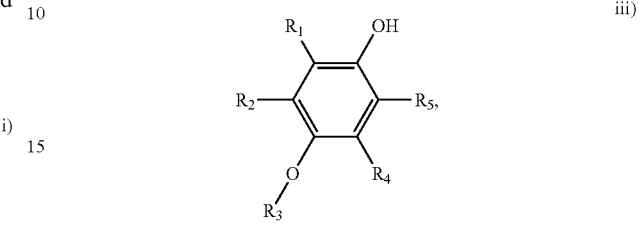

iii)

wherein, for Compound 3, R1, R2, R4 and R5 are each independently selected from H, an alkyl, or an alkoxy; and R3 is selected from H or an alkyl; or iv) a combination of two or more of Compounds 1 through 3.

9. The process of claim 1, wherein the comonomer composition further comprises a dialkyl-4-methylphenol, a dialkylphenol, or a combination thereof.

10. The process of claim 1, wherein greater than, or equal to, 20 wt % of the compressed comonomer composition is fed to reaction zone 1 and greater than 20 wt % of the compressed comonomer composition is fed to reaction zone 2 (i=2).

* * * * *